United States Patent [19]

Kouno et al.

[11] Patent Number: 4,912,001
[45] Date of Patent: Mar. 27, 1990

[54] ELECTROPHOTOGRAPHIC PHOTORECEPTOR COMPRISING AZO COMPOUND AND COUPLER

[75] Inventors: Hisao Kouno, Funabashi; Hiroaki Saikatsu, Koshigaya; Osamu Suda, Ohmiya; Tetsuhiro Umezaki, Koshigaya; Norio Tanaka, Adachi; Toshifumi Sekino, Kawaguchi; Masaru Hasegawa, Shibuya; Yoshio Abe, Iwatsuki; Shojiro Horiguchi, Ohmiya, all of Japan

[73] Assignee: Dainichi Seika Color & Chemicals Mfg. Co., Ltd., Tokyo, Japan

[21] Appl. No.: 288,574

[22] Filed: Dec. 22, 1988

[30] Foreign Application Priority Data

Dec. 29, 1987 [JP] Japan .................................. 62-333238

[51] Int. Cl.$^4$ .............................................. G03G 5/06
[52] U.S. Cl. ...................................... 430/71; 430/72; 430/58
[58] Field of Search ............................. 430/58, 71, 72

[56] References Cited

U.S. PATENT DOCUMENTS 4,356,243 10/1982 Ishikawa et al. ..................... 430/58

Primary Examiner—J. David Welsh
Attorney, Agent, or Firm—Wegner & Bretschneider

[57] ABSTRACT

An electrophotographic photoreceptor is provided with a photosensitive layer, which contains an azo compound having in the molecule thereof at least one azo group coupled with a couple residuum represented by the following general formula (I):

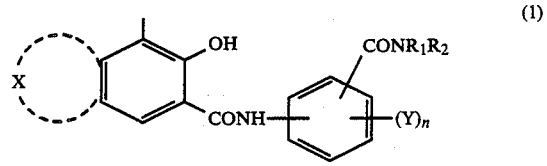

wherein X means an atomic group necessary for condensing with a benzene ring to form a substituted or unsubstituted aromatic hydrocarbon ring, or substituted or unsubstituted aromatic heterocyclic ring, Y denotes a radical selected from the group consisting of hydrogen, halogen atoms, cyano radicals, and substituted or unsubstituted alkyl, or alkoxy group, and n stands for an integer of 0~4, $R_1$ and $R_2$ designate, respectively, hydrogen, substituted or unsubstituted alkyl, substituted or unsubstituted alalkyl, substituted or unsubstituted aromatic hydrocarbon ring or substituted or unsubstituted aromatic heterocyclic ring, and said $R_1$ and $R_2$ may be mutually same or different, or may form a ring together with nitrogen atom.

2 Claims, No Drawings

ELECTROPHOTOGRAPHIC PHOTORECEPTOR COMPRISING AZO COMPOUND AND COUPLER

BACKGROUND OF THE INVENTION (1) Field of the Invention:

This invention relates to an electrophotographic photoreceptor, and more specifically to a novel electrophotographic photoreceptor provided with a photosensitive layer which contains a specific azo compound.

(2) Description of the Related Art:

In recent years, the utility of electrophotography is not limited to the field of copying machines but has expanded to various other fields where photographic techniques have conventionally been used, such as printing plates, slide films and microfilms. Investigations are also under way in order to apply electrophotography to high-speed printers which make use of a laser or CRT as a light source. The demand is hence moving toward a wide variety of electrophotographic photoreceptors of higher quality.

As photoreceptors for electrophotography, those having a photosensitive layer composed of an inorganic photoconductive material such as amorphous selenium, cadmium sulfide or zinc oxide as a principal component have been used primarily to date. Although photoreceptors formed of these inorganic materials are useful, they are still accompanied by various drawbacks.

With a view toward making improvements to the above drawbacks, electrophotographic photoreceptors making use various organic materials as photoconductive materials have been proposed and have started finding practical utility in recent years. Needless to say, an electrophotographic photoreceptor must have both carrier producing function and carrier transporting function. As organic compounds usable as carrier producing materials, numerous pigments have been proposed such as phthalocyanine type pigments, polycyclic quinoline type pigments, indigo type pigments, dioxazine type pigments, quinacridone type pigments and azo type pigments. There are however very few pigments which have been put to practical use. Since a carrier transporting substance can be chosen only from a limited range, it has not been obtained under the circumstances any carrier transporting substance which can meet satisfactorily the diversified demands for the electrophotographic process.

SUMMARY OF THE INVENTION

The present inventors have carried out an investigation with a view toward making improvements to organic electrophotographic photoreceptors. As a result, it has been found that an electrophotographic photoreceptor provided with a photosensitive layer containing an azo compound having in the molecule thereof at least one azo group coupled with a coupler residuum represented by the following general formula (I), has super electrophotographic characteristics, leading to the present invention.

Formula (I)

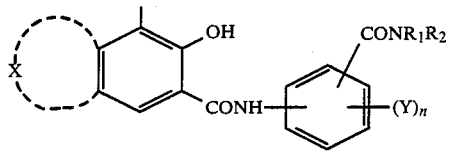

(1)

wherein X means atomic group necessary for condensing with a benzene ring to form a substituted or unsubstituted aromatic hydrocarbon ring, or substituted or unsubstituted aromatic heterocyclic ring, Y denotes a radical selected from the group consisting of hydrogen, halogen atoms, cyano radicals, and substituted or unsubstituted alkyl, or alkoxy group, and n stands for an integer of $0 \sim 4$, $R_1$ and $R_2$ designate, respectively, hydrogen, substituted or unsubstituted alkyl, substituted or unsubstituted alalkyl, substituted or unsubstituted aromatic hydrocarbon ring or substituted or unsubstituted aromatic heterocyclic ring, and said $R_1$ and $R_2$ may be mutually same or different, or may form a ring together with nitrogen atom.

The electrophotographic photoreceptor of this invention has excellent electrification characteristics, sensitivity characteristics and imageforming property as well as good sensitivity. In addition, its sensitivity and electrification characteristics undergo less variations even when employed repeatedly. It also undergoes little light-induced fatigue. It has high weatherability.

The above objects, features and advantages of the present invention will become apparent from the following description and the appended claims.

DETAILED DESCRIPTION OF THE INVENTION AND PREFERRED EMBODIMENTS

Among azo compounds usable in the present invention, those preferred particularly are bisazo, trisazo or tetrakis compounds which are represented by the following general formula (II): $CONR_1R_2$

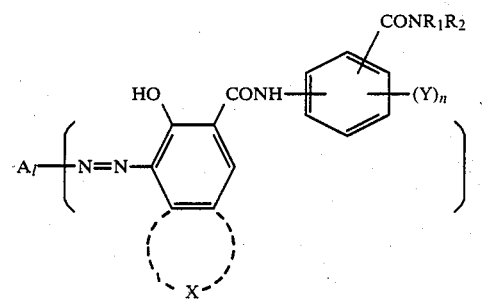

wherein l stands for an integer of $1 \sim 4$, X, Y, $R_1$ and $R_2$ have the same meaning as defined above, A means a group having a valence of l and selected from (a) hydrocarbon groups having at least one benzene ring, (b) nitrogen-containing hydrocarbon groups having at least two benzene rings and (c) hydrocarbon groups having at least two benzene rings and at least one heterocyclic ring.

In each of the above groups (a) and (b), each benzene ring may be condensed with one or more remaining benzene rings to form one or more condensed ring [where more than one benzene ring is contained in the case of the groups (a)], while the benzene rings in each of the groups (c) may be condensed with one or more remaining benzene rings or one or more heterocyclic rings to form one or more condensed rings.

The individual hydrocarbon groups, nitrogencontaining hydrocarbon groups, benzene rings and heterocyclic rings referred to above in connection with the definition for (a), (b) and (c) may each be substituted by halogen atoms, alkyl, alkoxy, alkylamino, arylamino, acylamino, nitro, or cyano group, or organic residues such as hydroxyl groups.

More specifically describing, the following groups may be mentioned as specific examples of the groups (a), (b) and (c).

As exemplary groups (a), the following groups may be mentioned:

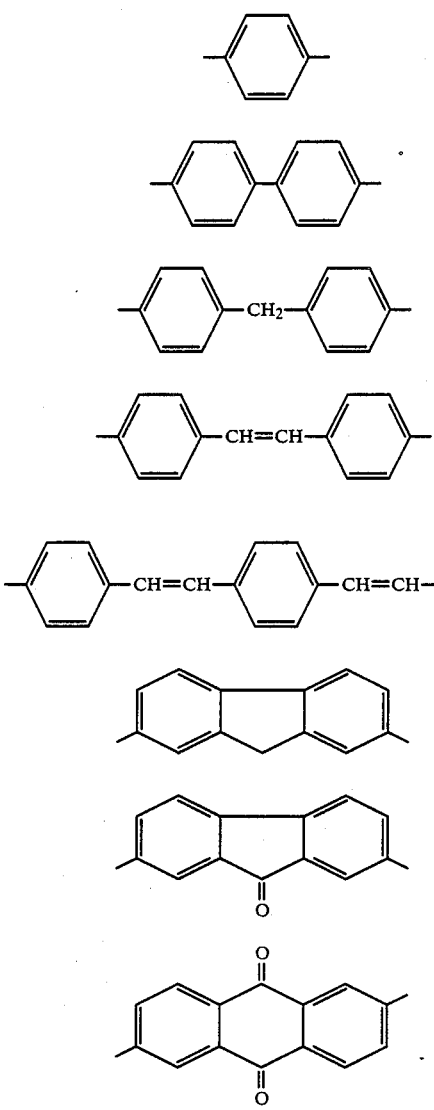

As exemplary groups (b), the following groups may be mentioned:

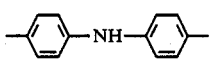  (1)

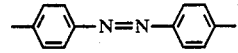  (2)

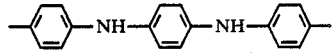  (3)

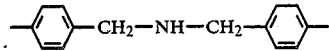  (4)

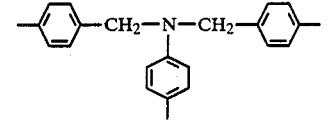  (5)

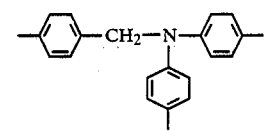  (6)

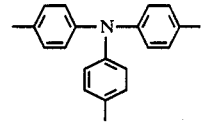  (7)

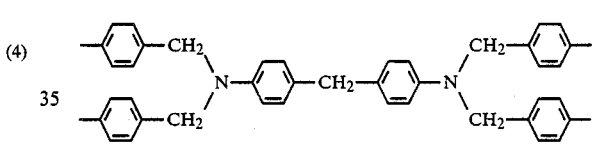  (8)

As exemplary groups (c), the following groups may be mentioned:

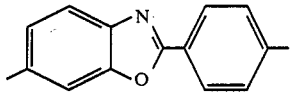  (1)

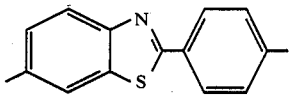  (2)

  (3)

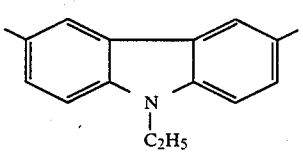  (4)

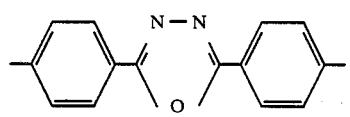  (5)

-continued (6) 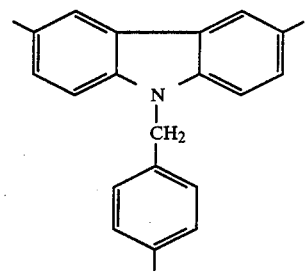

(7) 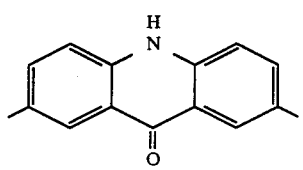

-continued (8) 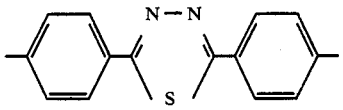

Owing to the use of the excellent carrier producing function of the azo compound represented by the general formula (II) as a carrier in a so-called laminated or dispersed electrophotographic photoreceptor, the electrophotographic photoreceptor of this invention is excellent in electrophotographic characteristics such as electrification characteristics, charge retaining ability, sensitivity and residual potential and moreover has a coating film of good physical properties. It is hence deteriorated less even when employed repeatedly, and its various characteristics do not vary substantially under heat, moisture and/or light. It can therefore exhibit stable performance.

Certain specific azo compounds having the structure represented by the general formula (II) will next be given by way of example, although they are not limited by these examples.

Examples of azo compounds represented by the general formula (II).

| Compound No. | A | n | coupler |
|---|---|---|---|
| (1) | 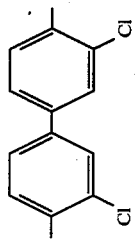 | 2 | 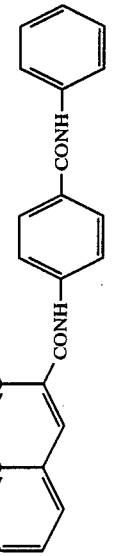 |
| (2) | 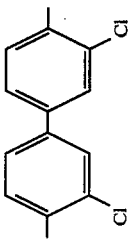 | 2 | 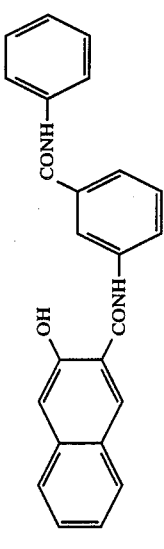 |
| (3) | 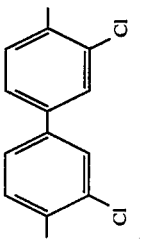 | 2 | 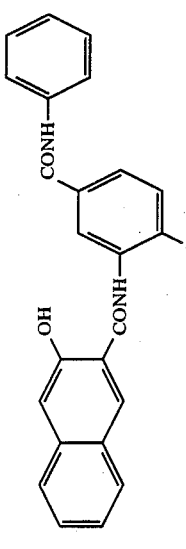 |
| (4) | 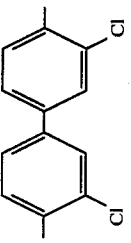 | 2 | 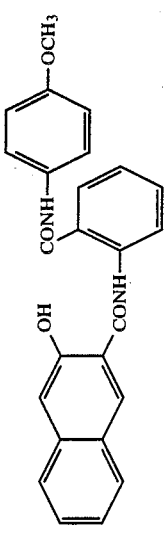 |
| (5) | 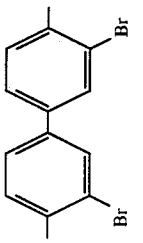 | 2 | 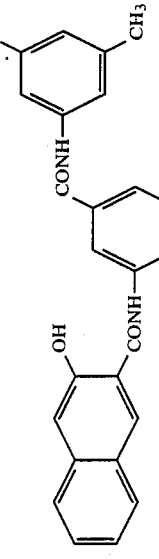 |

-continued
| Compound No. | A | n | coupler |
|---|---|---|---|
| (6) | 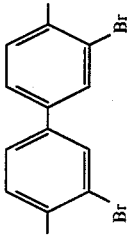 | 2 | 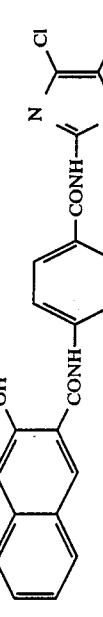 |
| (7) | 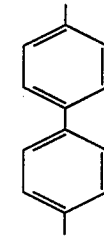 | 2 |  |
| (8) | 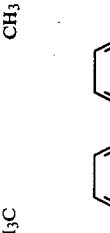 | 2 | 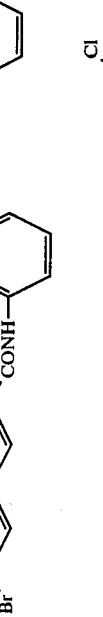 |
| (9) | 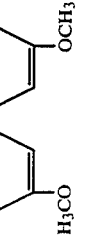 | 2 | 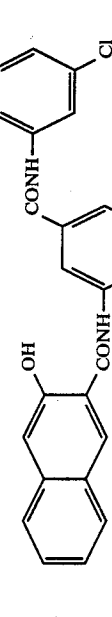 |
| (10) | 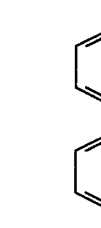 | 2 | 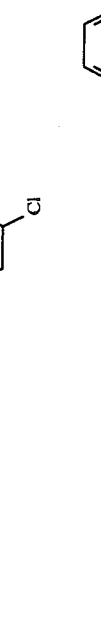 |

-continued
| Compound No. | A | n | coupler |
|---|---|---|---|
| (11) | 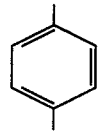 | 2 | 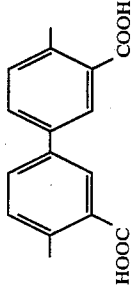 |
| (12) | 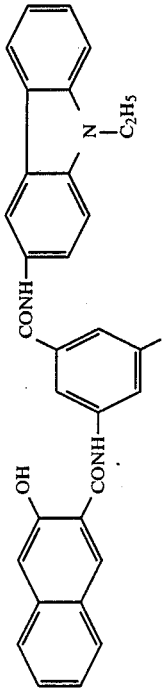 | 2 | 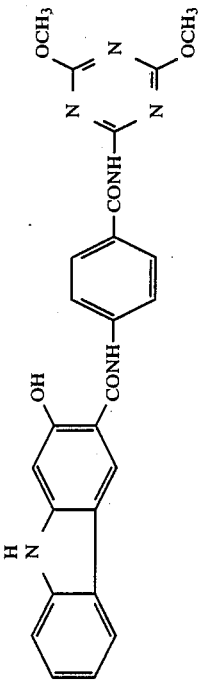 |
| (13) | 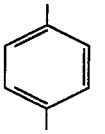 | 2 | 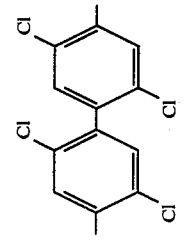 |
| (14) | 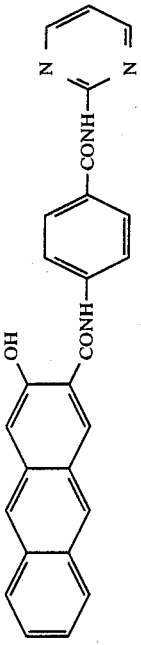 | 2 | 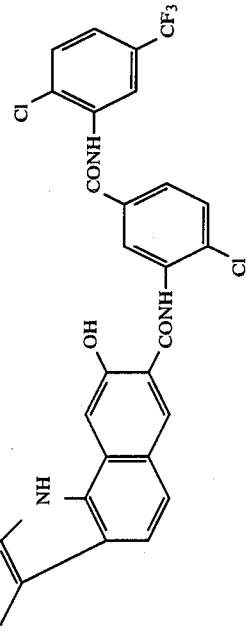 |

-continued
| Compound No. | A | n | coupler |
|---|---|---|---|
| (15) | 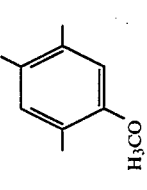 | 2 | 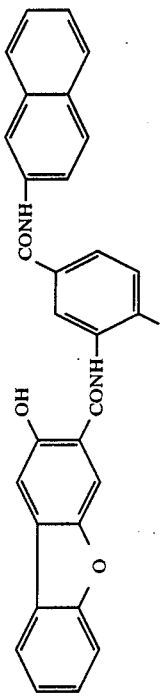 |
| (16) | 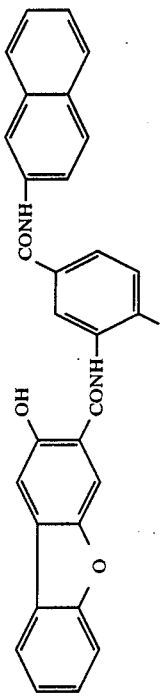 | 2 | 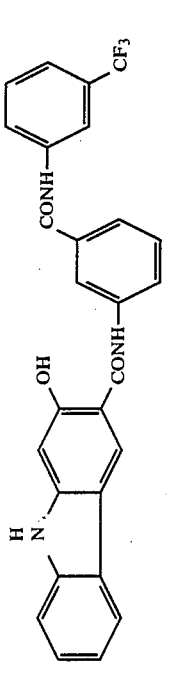 |
| (17) | 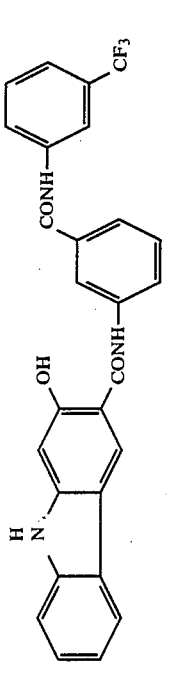 | 2 | 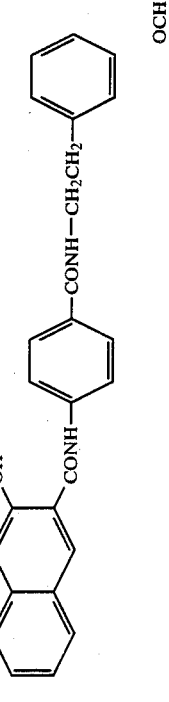 |
| (18) | 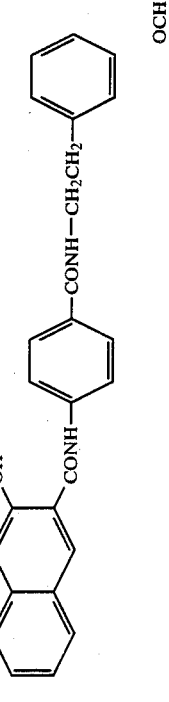 | 2 | 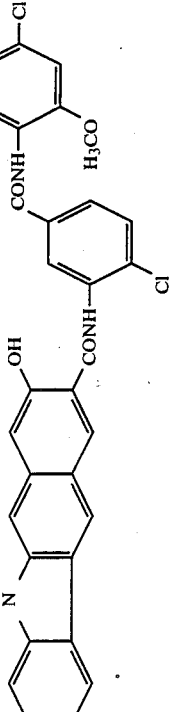 |
| (19) | 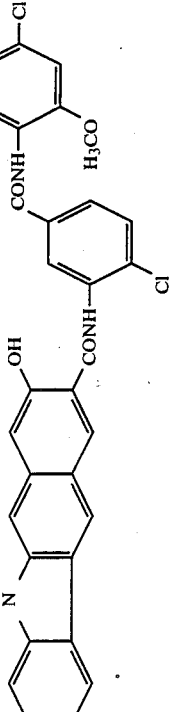 | 2 | 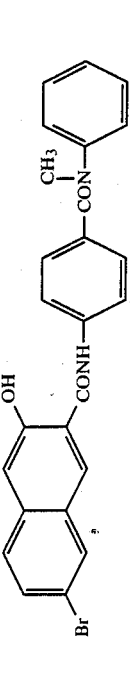 |

-continued

| Compound No. | A | n | coupler |
|---|---|---|---|
| (20) | [3,3'-dichloro-4,4'-dimethyl diphenylmethane structure] | 2 | [6-bromo-3-hydroxy-2-naphthoyl group with CONH-phenyl-CONH-(4-bromophenyl)] |
| (21) | [4,4'-dimethylstilbene] | | [3-hydroxy-2-naphthoyl-CONH-phenyl-CONH$_2$] |
| (22) | [4,4'-dimethylstilbene] | 2 | [3-hydroxy-2-anthroyl-CONH-phenyl(OC$_2$H$_5$)-CONH-pyridyl] |
| (23) | [α-cyano-4,4'-dimethylstilbene] | | [1-(o-tolylamino)-6-hydroxy-7-naphthoyl-CONH-phenyl-CONH-(3-chloro-2-methylphenyl)] |
| (24) | [4,4'-distyrylbenzene (bis-stilbene)] | 2 | [6-bromo-3-hydroxy-2-naphthoyl-CONH-phenyl-CONH-(2-naphthyl)] |

-continued

| Compound No. | A | n | coupler |
|---|---|---|---|
| (25) | 4-methylphenyl-CH=CH-C6H4-CH=CH-(4-methylphenyl) | 2 | 3-hydroxy-2-naphthoyl-NH-C6H4-NHCO-C(CH3)=N-N=C(CH3)-S |
| (26) | 4-methylphenyl-CH=CH-(1,3-C6H4)-CH=CH-(4-methylphenyl) | 2 | 3-hydroxy-2-naphthoyl-NH-(4-Br-3-substituted phenyl)-O-C6H4-N(CH3)2 |
| (27) | bis[4-(2-(4-methylphenyl)propan-2-yl)phenyl]-C(CH3)2 linker | 2 | 3,7-dihydroxy-2-naphthoyl-NH-C6H4-C2H5 |
| (28) | bis[4-(2-(4-methylphenyl)propan-2-yl)phenyl]-C(CH3)2 linker | 2 | 3-hydroxy-2-naphthoyl-NH-C6H4-CO-(2-NHCO-)- |
| (29) | bis(4-methylphenyl)C=O | 2 | 3-hydroxy-2-anthroyl-NH-(4-Cl-3-substituted phenyl)-CONH-(2-pyrimidinyl) |

-continued

| Compound No. | A | n | coupler |
|---|---|---|---|
| (30) | 4,4'-dimethylbenzophenone | 2 | 3-hydroxy-2-naphthoyl-NH—(3-)—C₆H₃—NH-CO—(2-C₂H₅)C₆H₄ |
| (31) | 4,4'-dimethylbenzophenone | 2 | 3-hydroxy-2-naphthoyl-NH—(3-)—(5-Cl)C₆H₃—NH-CO—(2-naphthyl) |
| (32) | 4,4'-dimethyldiphenyl ether | 2 | 3-hydroxy-2-naphthoyl-NH—(3-)—C₆H₃—NH-CO—(2-pyridyl) |
| (33) | 2,7-dimethylfluorenone | 2 | 3-hydroxy-2-naphthoyl-NH—(4-)—C₆H₃—NH-CO—C₆H₅ |
| (34) | 2,7-dimethylfluorenone | 2 | 3-hydroxy-2-naphthoyl-NH—(2-)—C₆H₄—CONH-n-C₄H₉ |

-continued
| Compound No. | A | n | coupler |
|---|---|---|---|
| (35) | 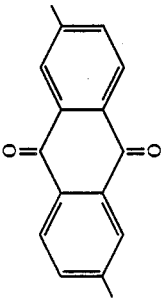 | 2 | 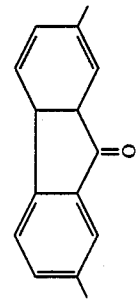 |
| (36) | 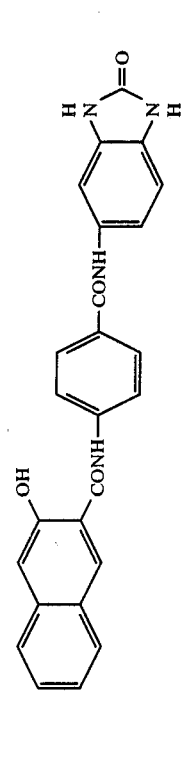 | 2 | 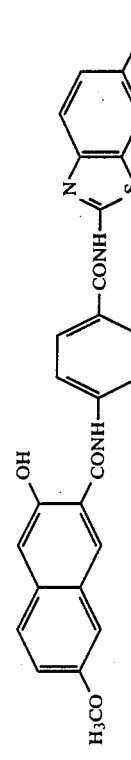 |
| (37) | 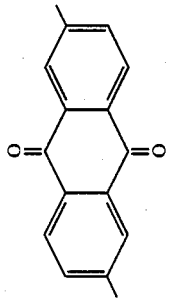 | 2 | 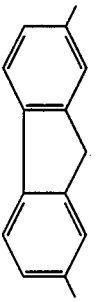 |
| (38) | 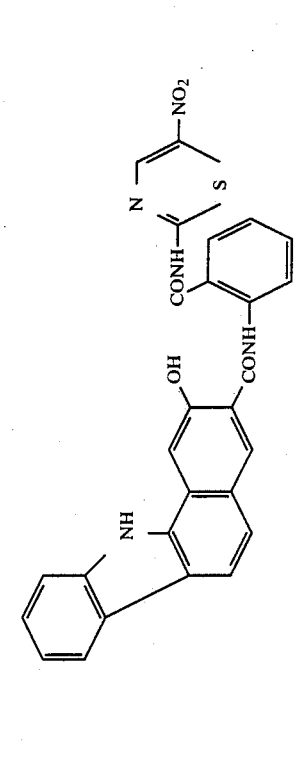 | 2 | 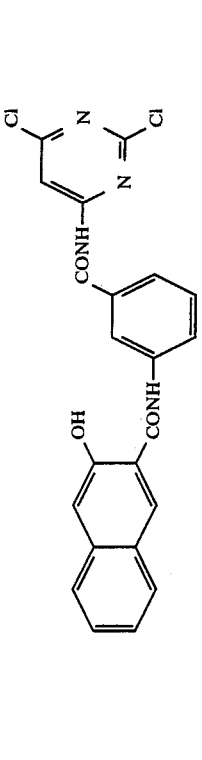 |

-continued

| Compound No. | A | n | coupler |
|---|---|---|---|
| (39) | 2,6-dimethylanthraquinone | 2 | (structure: hydroxynaphthalene-CONH-phenylene-CONH-phenyl-carbazole with N-C₂H₅ phenyl) |
| (40) | 4,4'-dimethyldiphenylamine | 2 | (structure: 3-methoxy-hydroxynaphthalene-CONH-phenylene-CONH-phenyl with NO₂) |
| (41) | 4,4'-dimethyldiphenylamine | 2 | (structure: dibenzofuranyl-CONH-chlorophenyl-CONH-hydroxy-dibenzofuran) |
| (42) | 4,4'-dimethylazobenzene | 2 | (structure: dibenzofuranyl-hydroxy-phenyl-CONH-chlorophenyl-CONH-methyl-methoxyphenyl) |

-continued

| Compound No. | A | n | coupler |
|---|---|---|---|
| (43) | (4-methylphenyl-N=N-4-methylphenyl) | 2 | anthracene-OH with two CONH groups; one linked to 4-pyridyl, other to phenyl-OCH₃ |
| (44) | (4-methylphenyl-NH-phenyl-NH-4-methylphenyl) | 2 | naphthalene-OH with CONH-phenyl-CONH-phenyl-CN |
| (45) | (4-methylphenyl-CH₂-NH-CH₂-4-methylphenyl) | 2 | naphthalene-OH with CONH-phenyl-O-phenyl(2,4-diCl) |
| (46) | (4-methylphenyl-CH₂-NH-CH₂-4-methylphenyl) | 2 | naphthalene(OH, OCH₃) with CONH-phenyl-CONH-phenyl-OCH₃ |

-continued
| Compound No. | A | n | coupler |
|---|---|---|---|
| (47) | 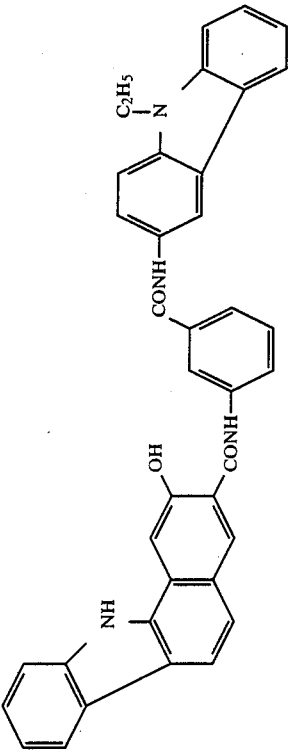 | 3 | 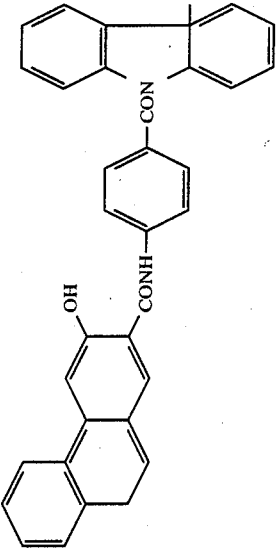 |
| (48) | 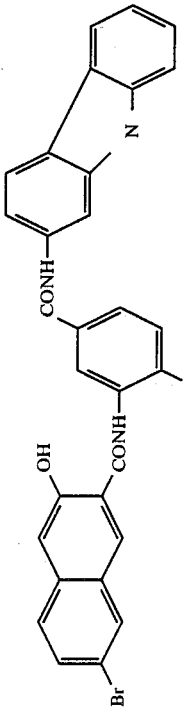 | 3 | 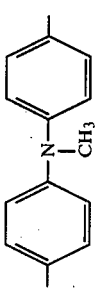 |
| (49) | 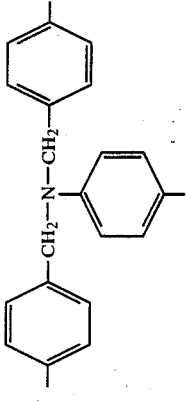 | 2 | 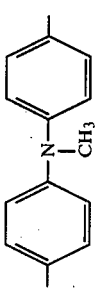 |

-continued

| Compound No. | A | n | coupler |
|---|---|---|---|
| (50) | 4-CH₃-C₆H₄-N(C₆H₄-4-CH₃)-CH₂- | 3 | 3-hydroxy-2-naphthoyl-NH-C₆H₄-NH-CO-C₆H₃(OCH₃)(OCH₃) |
| (51) | 4-CH₃-C₆H₄-N(C₆H₄-4-CH₃)-CH₂- | 3 | 3-hydroxy-2-naphthoyl-NH-C₆H₄-NHCO-(9,10-anthraquinonyl) |
| (52) | 4-CH₃-C₆H₄-N(C₆H₄-4-CH₃)-CH₂- | 3 | 3-hydroxy-2-naphthoyl-NH-C₆H₄-NH-CO-C₆H₄-CN |
| (53) | 4-CH₃-C₆H₄-N(C₆H₄-4-CH₃)-CH₂- | 3 | (complex naphthol with NH-o-tolyl, CONH-C₆H₃(OCH₃)-NHCO-C₆H₃(CF₃)₂) |

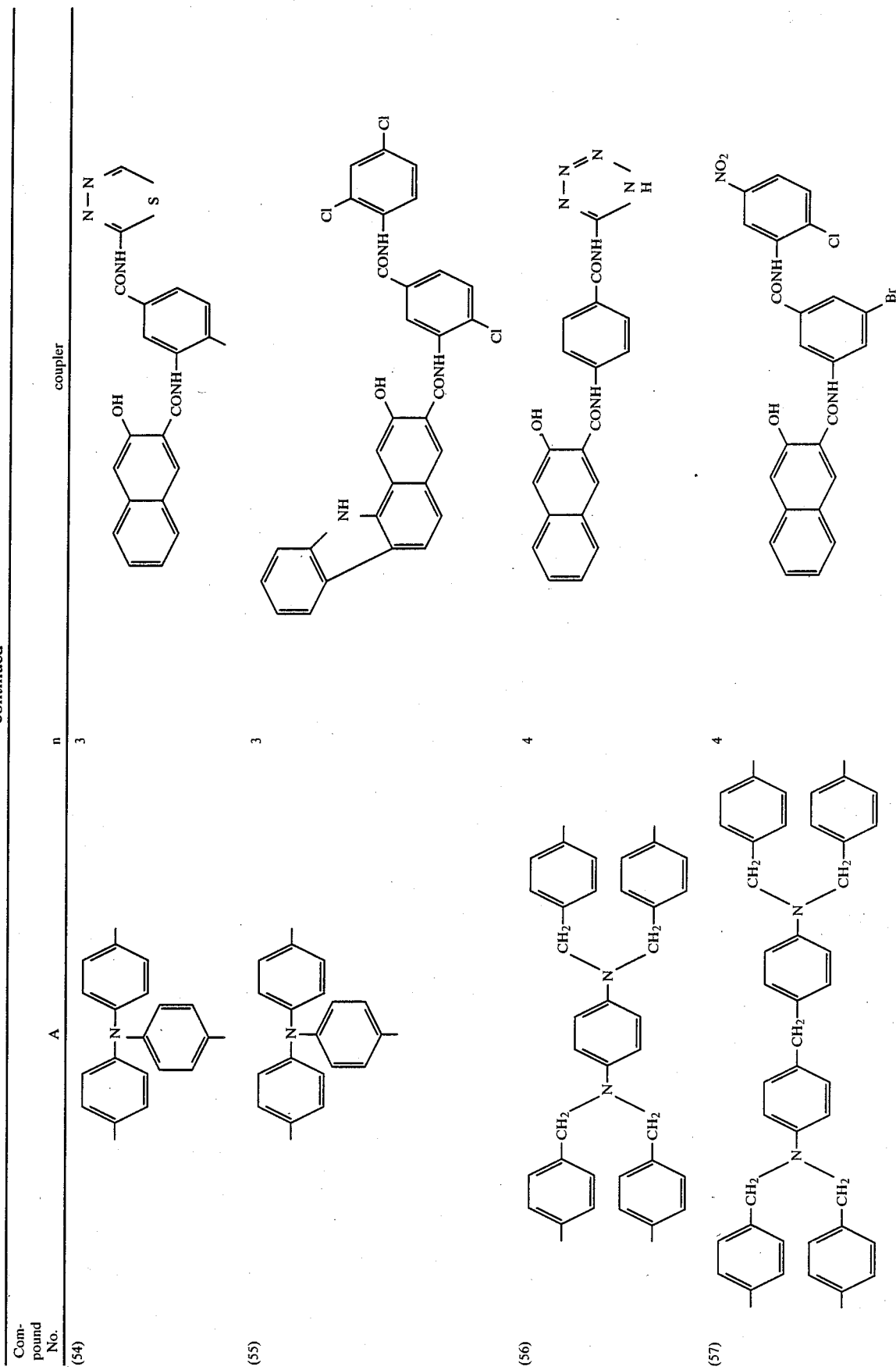

-continued

| Compound No. | A | n | coupler |
|---|---|---|---|
| (58) | 1,3,5-tris(4-methylphenyl)benzene | 3 | 3-hydroxy-N-(3-(N-methyl-N-phenylcarbamoyl)phenyl)-2-naphthamide |
| (59) | 9-ethyl-3,6-dimethylcarbazole | 2 | 3-hydroxy-N-(3-(N-benzylcarbamoyl)phenyl)-2-naphthamide |
| (60) | 9-ethyl-3,6-dimethylcarbazole | 2 | 6-methoxy-3-hydroxy-N-(4-(4,6-dimethoxy-pyrimidinyl)amino)-2-naphthamide |
| (61) | 9-benzyl-3,6-dimethylcarbazole | 2 | 3-hydroxy-N-(4-(N-methyl-N-benzylcarbamoyl)phenyl)-2-naphthamide |

-continued

| Compound No. | A | n | coupler |
|---|---|---|---|
| (62) | (di-tolyl-N-CH2-tolyl group) | 3 | (naphthol with NH-tolyl, CONH to bromophenyl-CONH-pyridyl) |
| (63) | (di-tolyl-N-tolyl group) | 3 | (naphthol with NH-tolyl, CONH-phenyl-CONH-biphenyl-N(C2H5)-tolyl) |
| (64) | (tolyl-C(=N-N=C)-tolyl with O) | 2 | (naphthol-CONH-phenyl-CONH-bis(CF3)phenyl) |
| (65) | (tolyl-C(=N-N=C)-tolyl with O) | 2 | (bromo-naphthol-CONH-phenyl-CONH-bis(OCH3)pyrimidyl) |

-continued

| Compound No. | A | n | coupler |
|---|---|---|---|
| (66) | bis(4-methylphenyl) attached via C=N-N=C with S bridge (thiadiazole-like) | 2 | 3-hydroxy-anthracene-2-carboxamide linked -CONH- to 2-methyl-4-[(2,5-dichlorophenyl)carbamoyl]phenyl |
| (67) | 2-amino-5-methylphenyl — C(=O) — 4-methylphenyl (2-aminobenzophenone with methyl groups) | 2 | 3-hydroxy-6-methoxy-naphthalene-2-carboxamide linked -CONH- to 3-methoxy-4-[(2-chloro-5-methoxyphenyl)carbamoyl]phenyl |
| (68) | bis(2,5-dimethylphenyl)sulfone | 2 | 3-hydroxy-naphthalene-2-carboxamide linked -CONH- to 2-chloro-4-(phenylcarbamoyl)phenyl |
| (69) | bis(2,5-dimethylphenyl)sulfide | 2 | 3-hydroxy-naphthalene-2-carboxamide linked -CONH- to 4-fluoro-3-[(pyridin-2-yl)carbamoyl]phenyl |

-continued

| Compound No. | A | n | coupler |
|---|---|---|---|
| (70) | 6-methyl-2-(4-methylphenyl)benzoxazole | 2 | 2-hydroxy-4-(dibenzofuran-yl)-N-[2-(benzimidazol-2-yl)phenyl]benzamide derivative |
| (71) | 6-methyl-2-(4-methylphenyl)benzoxazole | 2 | 3-hydroxy-7-bromo-N-[4-(naphthalen-1-ylthio)phenyl]-2-naphthamide derivative |
| (72) | 6-methyl-2-(4-methylphenyl)benzothiazole | 2 | 2-hydroxy-3-(2-methylphenylamino)-N-[4-(2-aminobenzoylphenyl)]benzamide derivative |
| (73) | 6-methyl-2-(4-methylphenyl)benzothiazole | 2 | 3-hydroxy-N-[4-(2-morpholinoethylaminocarbonyl)phenyl]-2-naphthamide derivative |

The above compounds can each be synthesized by a known process. A starting compound, i.e., an amine represented by the general formula $A(NH_2)l$ wherein $l$ stands for an integer of 1-4 and A has the same meaning as defined above is first diazotized by a method known per se in the art and the resulting diazonium salt is coupled with a coupler residuum of the general formula (I) in the presence of an alkali.

One synthesis example will hereinafter be described. Other azo compounds having the structure represented by the general formula (II) can also be synthesized in accordance with the following Synthesis Example, in which all designations of "part" and "parts" and "%" mean part and parts by weight and wt.%.

The scope of the present invention does not be limited by the examples.

SYNTHESIS EXAMPLE: (EXEMPLIFIED COMPOUND 1)

3,3'-Dichlorobenzidine (10.1 part) was dispersed in a mixture of 200 parts of water and 33 parts of 35% concentrated sulfuric acid. While maintaining the resultant dispersion at 0°-5° C., 61 parts of a 10% aqueous solution of sodium nitrite were added dropwise over 10 minutes under thorough stirring. After completion of the dropwise addition, the reaction mixture was stirred for further 15 minutes to obtain a solution of a diazonium salt.

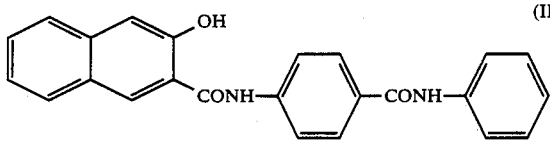

(III)

Then, 32.0 parts of a coupler of the above structural formula (III) were dissolved in 700 parts of a 2% aqueous solution of sodium hydroxide, followed by cooling. While maintaining the solution at 0°-5° C., the above solution of the diazonium salt was added dropwise over 15 minutes. After completion of the dropwise addition, the reaction mixture was stirred for further 2 hours, and the resultant azo compound was collected by filtration and then washed thoroughly to obtain 37.6 parts of Exemplified Compound 1 in a crude form. It was washed successively with DMF, methanol and water and then dried to obtain a purified product.

The physical construction of the electrophotografic photoreceptor of this invention may take any one of forms known to date. On a conductive substrate, a carrier producing layer composed principally of the above azo compound as a carrier producing substance and a carrier transporting layer composed principally of a carrier transporting substance may be laminated. As an alternative, a photosensitive layer formed by dispersing a carrier producing substance in a carrier transporting substance may be provided on such a conductive substance. These layers may be provided with an intermediate layer interposed therebetween. The following patterns may be therefore be feasible by way of example.

(I) substrate/carrier producing layer/carrier transporting layer.

(II) substrate/carrier transporting layer/carrier producing layer.

(III) substrate/carrier transporting layer containing a carrier producing substance.

(IV) substrate/intermediate layer/carrier producing layer/carrier transporting layer.

(V) substrate/intermediate layer/carrier transporting layer/carrier producing layer.

(VI) substrate/intermediate layer/carrier transporting layer containing a carrier producing substance.

The term "intermediate layer" as used herein means a barrier layer or bonding layer. For the purpose of surface protection or the like, a thin layer may also be provided on an electrophotographic photoreceptor of any one of the above construction patterns.

Carrier transporting substances include those transporting electrons and those transporting holes. Both types of carrier transporting substances may be used for the formation of electrophotographic photoreceptors according to this invention.

Electrophotographic photoreceptors according to this invention can be produced by a usual method in accordance with techniques known in the production of electrophotographic photoreceptors making use of an organic photoconductive substance. For example, a carrier producing layer forming a photosensitive layer of a double-layered structure may be formed by grinding any one of the above azo compounds into fine particles in a suitable medium, adding a binder as needed, applying the resultant coating formulation on a conductive substrate either directly or with an intermediate layer interposed therebetween or applying the coating formulation on a carrier transporting layer formed in advance, and then drying the thus-applied coating formulation.

It is necessary to grind the azo compound into fine particles of 5 μm or smaller, preferably 3 μm, most preferably 1 μm so that the fine particles are dispersed uniformly in the medium. When a binder is employed, no particular limitation is imposed thereon. It is however preferable to use as a binder a film-forming high molecular compound which is hydrophobic and electrically insulating and has a high dielectric constant. Various kinds of thermoplastic and thermosetting synthetic resins may be used suitably. As is understood easily, it is convenient if the above medium has ability to dissolve the binder. The binder may be used in an amount selected from a range of 0.1-5 times in weight the carrier producing substance described above. The thickness of the carrier producing layer may be controlled to a range of 0.01-20 μm with 0.05-5 μm being preferred.

The carrier transporting layer can be formed by either dispersing or dissolving a carrier transporting substance in a suitable medium, coating the resultant dispersion or solution, and then drying same. It is preferred to use a binder except where the carrier transporting substance itself can also serve as a binder like poly-N-vinylcarbazole or polyglycidylcarbazole. The binder may be of the same type as that used for the formation of the carrier producing layer. It is suitable to use the binder in an amount 0.2-5 times in weight the carrier transporting substance. The thickness of the carrier transporting layer may be within a range of 1-100 μm with 5-50 μm being preferred.

In order to form a carrier producing layer-carrier transporting layer of the dispersion type on the other hand, it is only necessary to dissolve or disperse the carrier transporting substance in the above-described dispersion for the formation of the carrier producing layer and then to apply the resulting coating formulation on a conductive substrate. Although any carrier transporting substance may be chosen as desired, it is generally preferable to add a binder except where a carrier transporting substance also useful as a binder is used. When an intermediate layer is provided between the conductive substrate and the laminated or dispersed photosensitive layer, the intermediate layer is composed of one or more of a carrier producing substance, carrier transporting substance, binder, additives, etc. They are materials employed commonly in the art and are used in amounts not impairing the function as an intermediate layer. The film thickness is 10 μm or thinner, preferably, 1 μm or thinner.

Other known techniques may also be applied to the electrophotographic photoreceptor of the present invention. For example, the photosensitive layer may contain a sensitizer. As suitable sensitizers, may be mentioned Lewis acids capable of forming charge transfer complexes with organic photoconductive substances, dyes, pigments, etc. It is also possible to incorporate additives such as plasticizer, ultraviolet absorbent, oxidation inhibitor, lubricant, bonding accelerator and dispersant with a view toward improving the film-forming property, flexibility, mechanical strength, etc. of the photosensitive layer. Within ranges not impairing the electrophotographic photoreceptor characteristics intended in the present invention, a carrier producing substance and carrier transporting substance may be added.

As a method for forming the carrier producing layer and carrier transporting layer as well as the intermediate layer and surface layer, a usual coating method may be used in the present invention.

As will also become apparent from Examples to be described next, the electrophotographic photoreceptor of this invention has excellent electrification characteristics, sensitivity characteristics and imageforming property as well as good sensitivity. In addition, its sensitivity and electrification characteristics undergo less variations even when employed repeatedly. It also undergoes little light-induced fatigue. It has high weatherability.

The present invention will next be described more specifically by the following Examples, in which all designations of "part" and "parts" mean part by weight and parts by weight.

EXAMPLE 1:

One part of Exemplified Compound 1, described above, and 1 part of a polyester resin ["Vyron 200" (trade name): product of Tokyo Co., Ltd.] were dispersed thoroughly in 50 parts of tetrahydrofuran by means of a ball mill. A dispersion thus obtained was coated on an aluminum sheet by a wire coater and then dried for 30 minutes with hot air of 120° C. to provide a carrier producing layer of 0.3 μm thick.

Coated over the carrier producing layer was a solution which had been obtained by dissolving 5 parts of p-diethylaminobenzaldehyde-N-phenyl-N-hydrazone and 5 parts of a polycarbonate resin ["Panlite L-1250", trade name; product of Teijin Chemicals Ltd.] in 70 parts of 1,2-dichloroethane. The solution was dried for 3 hours with warm air of 60° C., thereby forming a carrier transporting layer of 14 μm thick.

A photoreceptor thus fabricated was left over in an atmosphere of 25° C. and 55% R.H. (relative humidity) to adjust its humidity. Using a static paper testing apparatus ("SP-428", trade name: manufactured by Kawaguchi Denki Seisakusho K.K.), it was thereafter corona-charged at a voltage of −5 KV by the static method. After holding it for 10 seconds in a dark place, it was exposed to light from a tungsten lamp as a light source in such a way that the illuminance became 5.0 lux on the sample surface, whereby its electrophotographic characteristics were evaluated. The following results were obtained.

$V_D$: −800 (v)

$V_{D10}$(percentage of potential retained for 10 seconds in a dark place): 82 (%)

$E_{\frac{1}{2}}$(half decay exposure): 2.0(lux-sec)

EXAMPLE 2:

A photoreceptor was fabricated in the same manner as in Example 1 except for the use of Exemplified Compound 2. Its characteristics were measured in the same manner as in Example 1. The following results were obtained.

$V_D$: −730 (v)

$V_{D10}$: 87 (%)

$E_{\frac{1}{2}}$: 1.9(lux-sec)

EXAMPLE 3:

Exemplified Compound 3 (1.5 parts) and 1 parts of a polyester resin ["Vyron 200" (trade name): product of Toyobo C., Ltd.] were dispersed thoroughly in 250 parts of 1,2-dichloroethane by means of a ball mill. A dispersion thus obtained was coated on an aluminum-deposited polyester film and then dried for 30 minutes with hot air of 120° C. to provide a carrier producing layer of 0.5 μm thick.

Coated over the carrier producing layer was a solution which had been obtained by dissolving 10 parts of 9ethylcarbazole-3-carbaldehyde-N,N-diphenyl-hydrazone and 10 parts of a polyester resin ("Vylon 200" described above) in 100 parts of 1,2-dichloro-ethane. The solution was dried for 3 hours with warm air of 60° C., thereby forming a carrier transporting layer of 15 μm thick.

Characteristics of the electrophotographic photoreceptor were measured. The following results were obtained.

$V_D$: −690 (v)

$V_{D10}$: 93 (%)

$E_{\frac{1}{2}}$: 2.3(lux-sec)

EXAMPLE 4–15

Photoreceptors were fabricated separately in the same manner as in Example 3 except that the following exemplified compounds were used in place of Exemplified Compound 3). Their characteristics are as follows.

| Ex. | Compound No. | $V_D$ (−V) | $V_{D10}$ (%) | $E_{\frac{1}{2}}$ (lux-sec) |
| --- | --- | --- | --- | --- |
| 4 | (7) | 860 | 74 | 5.0 |
| 5 | (14) | 700 | 86 | 2.5 |
| 6 | (16) | 590 | 79 | 2.2 |
| 7 | (18) | 820 | 76 | 2.3 |
| 8 | (20) | 600 | 93 | 3.0 |
| 9 | (22) | 680 | 84 | 1.8 |
| 10 | (23) | 720 | 82 | 4.1 |
| 11 | (27) | 680 | 89 | 2.6 |
| 12 | (33) | 720 | 92 | 1.5 |
| 13 | (36) | 680 | 85 | 2.1 |
| 14 | (42) | 670 | 84 | 3.3 |
| 15 | (44) | 730 | 88 | 2.3 |
| 16 | (48) | 590 | 74 | 2.5 |
| 17 | (51) | 520 | 83 | 2.8 |
| 18 | (52) | 550 | 86 | 1.5 |
| 19 | (55) | 610 | 79 | 3.9 |
| 20 | (57) | 780 | 77 | 1.9 |

-continued

| Ex. | Compound No. | $V_D(-V)$ | $V_{D10}(\%)$ | $E_{\frac{1}{2}}$ (lux-sec) |
| --- | --- | --- | --- | --- |
| 21 | (61) | 630 | 91 | 2.6 |
| 22 | (65) | 560 | 88 | 3.0 |
| 23 | (66) | 750 | 90 | 2.4 |
| 24 | (69) | 590 | 87 | 4.2 |
| 25 | (73) | 650 | 95 | 2.8 |

EXAMPLES 26:

The electrophotographic photoreceptor fabricated in Example 1 was repeatedly subjected 1,000 times to a charging-discharging cycle, so that variations in its characteristics were investigated. As readily envisaged from the following results, the electrophotographic photoreceptor was found to have excellent repeatability.

|  | 100th cycle | 1,000th cycle |
| --- | --- | --- |
| $V_D$ (v) | 810 | 810 |
| $V_{D10}$ (%) | 80 | 81 |
| $E_{\frac{1}{2}}$ (lux-sec) | 2.2 | 2.0 |

EXAMPLE 27:

An intermediate layer made of a vinyl chloridevinyl acetate-maleic anhydride copolymer ("S-LEC MF-10", trade name: product of Sekisui Chemical Co., Ltd.) and having a thickness of 0.02 μm was provided on an aluminumlaminated polyester film (thickness of aluminum foil: 10 μm). A dispersion, which had been obtained by dispersing 1 part of Exemplified Compound 2 in 50 parts of 1,4-dioxane by means of an attritor, was coated on the intermediate layer and then dried for 30 minutes with hot air of 120° C., whereby a carrier producing layer of 0.2 μm thick was provided.

A solution, which had been prepared by dissolving 6 parts of 2,5-bis(4-N,N-diethylamino-phenyl)-1,3,4-oxadiazole and 10 parts of a polycarbonate resin ("Iupilon S-100", trade name: product of Mitsubishi Gas Chemical Company, Inc.) in 100 parts of 1,2-dichloroethane, was coated on the carrier producing layer, followed by drying for 3 hours with warm air of 60° C. to form a carrier transporting layer of 10 μm thick.

The $E_{\frac{1}{2}}$ of an electrophotographic photoreceptor thus obtained was measured. It was found to be 1.9 lux·sec. That electrophotographic photoreceptor was electrified by corona discharge at −7 KV in a dark place. After exposure to light of a maximum light intensity of 30 lux·sex to form a latent image, the latent image was developed by the magnetic brush development method, followed by transfer of the thusdeveloped image. As a result, vivid marks having sufficient contrast and good graduation were obtained.

Even when the copying test was repeated 2,000 times, the resultant marks remained good and no changes were observed thereon.

We claim:

1. In an electrophotographic photoreceptor having a photosensitive layer, the improvement wherein the photosensitive layer contains an azo compound having in the molecule thereof at least one azo group coupled with a coupler residuum represented by the following general formula (I):

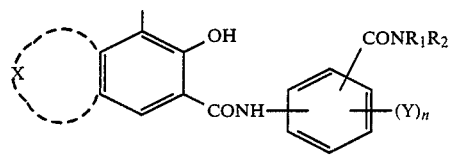

wherein X means an atomic group necessary for condensing with a benzene ring to form a substituted or unsubstituted aromatic hydrocarbon ring, or substituted or unsubstituted aromatic heterocyclic ring, Y denotes a radical selected from the group consisting of hydrogen, halogen atoms, cyano radicals, and substituted or unsubstituted alkyl, or alkoxy group, and n stands for an integer of 0~4, $R_1$ and $R_2$ designate, respectively, hydrogen, substituted or unsubstituted alkyl, substituted or unsubstituted alalkyl, substituted or unsubstituted aromatic hydrocarbon ring or substituted or unsubstituted aromatic heterocyclic ring, and said $R_1$ and $R_2$ may be mutually same or different, or may form a ring together with nitrogen atom.

2. The photoreceptor as claimed in claim 1, wherein the photosensitive layer contains a carrier producing substance and a carrier transporting substance and the carrier producing substance is the azo compound having said at least one azo group coupled with the coupler residuum represented by the general formula (I).

* * * * *